C. Howard.
Whiffletree.
Nº 8,824.   Patented Mar. 23, 1852.
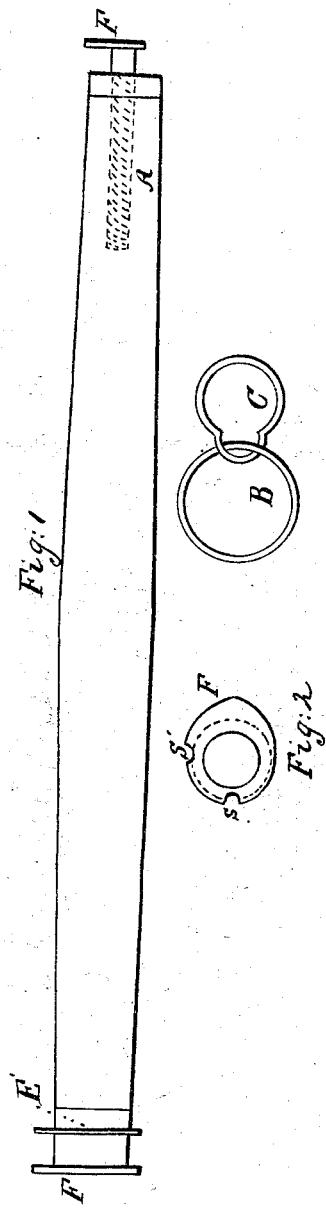

UNITED STATES PATENT OFFICE.

CHARLES HOWARD, OF MADISON COUNTY, ILLINOIS.

SWINGLETREE.

Specification of Letters Patent No. 8,824, dated March 23, 1852.

*To all whom it may concern:*

Be it known that I, CHARLES HOWARD, of the county of Madison, in the State of Illinois, have invented a new and improved mode of attaching traces to single or swingle trees, swingletrees to doubletrees, breast straps or chains to neck-yokes, bridle-reins or check-lines to bridle-bits, breechings or back-bands to shafts, and which may be used for the purpose of attaching many other things wherever there is an angle at the point of attachment; and I do hereby declare that the following is a full and exact description thereof, reference being had to the accompanying drawings, making a part of this specification, and to the letters and figures marked thereon.

The nature of my invention consists of a flange, made or cast of a suitable material, on a socket or ring, such as is exhibited at F, F, in the drawings, Figures 1 (one) and 2 (two), or upon a bolt head, a pin head, a screw head, a nail head, a stud, a knob, or upon any thing else of a suitable form such as is exhibited in the drawings on the bolt head at A, F, Fig. 1 (one), the flange to have a slit or notch in it as indented at S, S, such as is exhibited in the drawings Fig. 2 (two). The breast chains or straps and the ends of the traces, tugs, bridle reins or check lines, breechings, back bands or the other things to be attached, must be furnished with a ring B and a link C, as exhibited in the drawings. The link, however, may be of any shape so that a part of it is adjusted to pass through the slit or notch S, S, on the flange, the ring just large enough to pass over the flange by bringing the end of the link or part (according to its shape) to, and passing it through, the slit or notch of the flange, and when the ring is thus on the flange or over the flange, the link is to be brought to the widest part of the flange, where it is to be worn which will effectually secure the ring from falling off or becoming detached until the link is carried back to the slit or notch in the flange again, which can never occur by accident. The widest part of the flange should always be at the point of draft and the slit or notch S, S, Fig. 2 (two), may be adjusted on the top or rear, but it is best at the rear.

E, is a guard flange to prevent the ring from sliding over the swingletree when the flange is used on the socket or ring; and A is a bolt to exhibit the flange on the things mentioned above.

The object of this invention is to prevent the numerous accidents which are daily occurring by different things becoming untimely detached, and the mode of its construction and use are so simple that a further description is deemed unnecessary.

I do not claim the ring and link as my invention, but,

What I do claim as my invention and desire to secure by Letters Patent, is—

The flange F, F, F, above set forth, wrought, or cast, in combination with the ring B, and link C, for the purpose of forming attachments, substantially in the mode set forth above.

CHAS. HOWARD.

Witnesses:
S. W. ROBBINS,
CHAS. COOK.